(12) United States Patent
VanDevender et al.

(10) Patent No.: US 7,725,037 B2
(45) Date of Patent: May 25, 2010

(54) OPTICAL SWITCH BASED ON PARAMETRIC INTERACTION

(75) Inventors: Aaron Pace VanDevender, Champaign, IL (US); Paul G. Kwiat, Savoy, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 792 days.

(21) Appl. No.: 11/598,510

(22) Filed: Nov. 13, 2006

(65) Prior Publication Data

US 2008/0085123 A1    Apr. 10, 2008

Related U.S. Application Data

(63) Continuation-in-part of application No. 11/539,396, filed on Oct. 6, 2006, now abandoned.

(51) Int. Cl.
*H04B 10/12* (2006.01)
*H04B 10/00* (2006.01)

(52) U.S. Cl. ............. 398/151; 398/149; 398/150; 398/152

(58) Field of Classification Search ........ 398/140, 398/149, 150, 151, 152, 153, 165, 82, 157, 398/118, 92, 95, 39
See application file for complete search history.

(56) References Cited

U.S. PATENT DOCUMENTS 5,406,407 A      4/1995   Wolff .................. 359/326
2006/0051100 A1*  3/2006   Watanabe .............. 398/152

OTHER PUBLICATIONS

Myers et al., "*Quasi-phase-matched optical parametric oscillators in bulk periodically poled LiNbO$_3$*", J. Opt. Soc. Am. B, pp. 2102-2115, vol. 12, No. 11, Nov. 1995.
Kanter, et al. "*Wavelength-Selective Pulsed All-optical Switching Based on Cascaded Second-Order Nonlinearity in a Periodically Poled LithiumNiobate Waveguide*," IEEE Photonics Technology Letters, vol. 13, No. 4, pp. 341-343, Apr. 2001.
Kanbara, et al. "*All-optical Switching Based on Cascading of Second Order Nonlinearities in a Periodically Poled Titanium-Diffirsed Lithium Niobate Waveguide*," IEEE Photonics Technology Letters, vol. 11, No. 3, pp. 328-330, Mar. 1999.

* cited by examiner

*Primary Examiner*—M. R. Sedighian
(74) *Attorney, Agent, or Firm*—Sunstein Kann Murphy & Timbers LLP

(57) ABSTRACT

A method and apparatus for switching at least one wavelength component of an optical signal beam from a first state to a second state. The phase characterizing the optical signal component is incremented by interaction with one or more escort beams in a non-linear medium thereby switching the state of the optical signal component on the basis of its incremented phase. Multiple escort beams may also be employed to switch different wavelength components of the signal. The method may be employed to achieve high speed, and substantially transparent, switching of phase, intensity or polarization of a signal.

17 Claims, 4 Drawing Sheets

OPTICAL SWITCH BASED ON PARAMETRIC INTERACTION

This application is a continuation-in-part of copending U.S. patent application Ser. No. 11/539,396, filed Oct. 6, 2006, which is incorporated herein by reference.

This invention was made with Government support under Contract Number DAAD19-03-01-0019 and W911NF-05-1-0397 awarded by the US Army Research Office (ARO). The Government has certain rights in the invention.

TECHNICAL FIELD AND BACKGROUND ART

The present invention pertains to methods and apparatus for routing optical signals, and more particularly to rapid switching of optical signals on the basis of frequency-selective interaction with an escort beam in a non-linear medium.

Fast optical switching is an essential component of high-speed optical networking. Optical switching methods currently employ either mechanical motion, such as the motion of mirrors driven by micro-electromechanical systems (MEMS) or, otherwise, are based upon modification of a material characteristic of the switching medium, which may be expressed in terms of the nonlinear polarizability of the medium. Thus, the effective index of refraction of the medium is modified, either by virtue of modifying the lattice structure of the medium or, as in the case of optical nonlinearity in semiconductor devices, by generation of real charge carriers.

A straightforward approach to switching based on nonlinear polarizability encompasses electro-optic devices, relying, for example, on the Pockels effect (or the Kerr effect) to induce (or modify) birefringence as a function of an applied electric field, thus changing the phase for certain polarizations. This is used in all electro-optic waveguide modulators. A salient disadvantage of such effects is that the induced phase modification will be nearly the same for all nearby wavelengths. Therefore, there is no simple way to make a wavelength-dependent switch. Moreover, to achieve a stable zero-phase configuration, electro-optic devices typically have "dither-and-feedback" circuits to hold quadrature points; however those both add to complexity and limit the extinction ratio.

While the nonlinearity of a switching medium may be naturally occurring, nonlinearities may also be achieved through synthesis of photonic crystals, as described, for example by Mazurenko et al., *Ultrafast Optical Switching in Three-Dimensional Photonic Crystals*, Phys. Rev. Lett., vol. 91, p. 213903, (2003), which is incorporated herein by reference.

Switching speeds are limited, in the case of real carrier generation, by recombination times which can be long (~ns). Off-resonance excitation in the optical Stark effect regime (a splitting or shifting of energy levels of the material) is subpicosecond, however, typically requiring very high switching intensities, often $>10^9$ W-cm$^{-2}$. Moreover, such fields give rise to generation of real carriers by one- or two-photon absorption, again implicating recombination time limitations mentioned above.

Limitations of the foregoing optical switching methods may be traced to their reliance upon the generally small third-order non-linear polarizabilities of materials, and the high absorption inherent in the fact that these third-order non-linear polarizabilities are achieved close to the semiconductor absorption-band edge.

It is thus desirable to implement a fast optical switch in a medium which is transparent and suitable for switching over a wavelength band sufficiently broad to accommodate a typical optical communications band, and in which optical switching may be based upon the typically stronger second-order non-linear polarizability of the material and is not limited by recombination times of free carriers in the medium.

SUMMARY OF THE INVENTION

In accordance with preferred embodiments of the present invention, methods and apparatus are provided for frequency-selective optical switching. In one embodiment, a method is provided for switching at least one component of an optical signal from a first state to a second state, the optical signal component characterized by a first signal wavelength and a phase at that wavelength. The method has steps of:

a. incrementing the phase of the optical signal component by interaction with a first escort beam in a non-linear medium; and b. switching the state of the optical signal component on the basis of its incremented phase.

In other embodiments of the invention, the non-linear medium may be characterized by a second-order nonlinear polarizability or a third-order nonlinear polarizability. The state of the optical signal component may include transmission through a port of an interferometer, for example, or polarization. The step of incrementing the phase of the optical signal component may include converting at least a portion of the energy in the optical signal component to an idler wavelength and back to the first signal wavelength in a parametric process. Additionally, the method may also include separately controlling a state of a second component of the optical signal by virtue of interaction within the non-linear medium with a second escort beam.

In accordance with another aspect of the invention, an optical switch is provided that has an input port for receiving a signal beam including of at least one wavelength component. The optical switch also has a non-linear medium in optical communication with the import port, a coupler for coupling an escort beam into the non-linear medium, and an analyzer element for directing a wavelength component of the signal beam to a specified one of a first and a second output port based upon whether a phase shift of π radians has been imposed upon the wavelength component of the signal beam by mutual interaction of the signal beam and escort beam within the non-linear medium.

In alternate embodiments of the invention, the non-linear medium may comprise one or more non-linear crystals, including a crystal characterized by a second-order or third-order nonlinear polarizability. The analyzer element may be an interferometer, in particular, the analyzer element may be a Mach-Zehnder interferometer containing a non-linear medium within one or both of its arms. Alternatively, the analyzer element is a polarizing beam splitter. The non-linear medium may be a periodically poled non-linear crystal, and the coupler, for coupling the escort beam into the non-linear medium, may be a dichroic beamsplitter.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In accordance with preferred embodiments of the invention, a frequency-multiplexed transparent optical switch is provided such as may be applied advantageously for use in telecommunication applications.

One embodiment of the invention that will serve for purposes of exemplary description is now discussed with reference to FIG. 1. The interferometer may be constructed either in a free space and bulk crystal configuration, or in a fiber and waveguide configuration. For simplicity, the bulk crystal configuration of FIG. 1 is described first.

Figure 1:
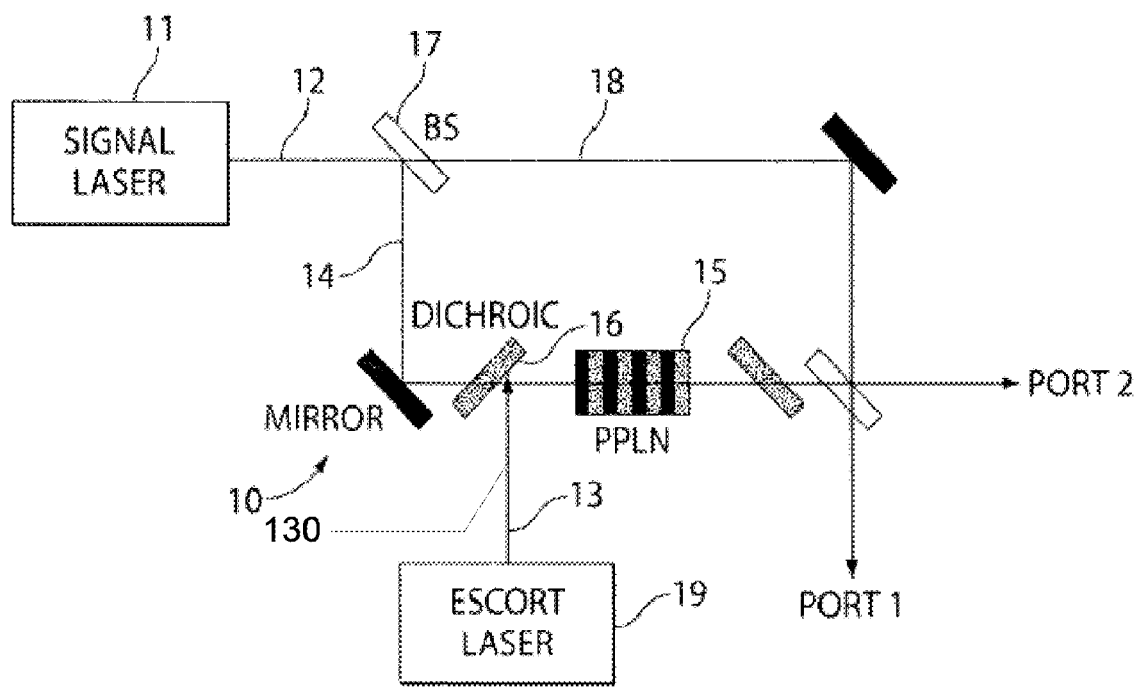
FIG. 1 is a schematic depiction of an embodiment of the present invention configured as a Mach-Zehnder interferometric switch.

As shown schematically in FIG. 1, light 12 emitted by a signal laser 11 at wavelength $\lambda_1$ is sent through a Mach-Zehnder interferometer, designated generally by numeral 10. The signal beam is split by the first beam splitter 17 into arms 14 and 18. In arm 14, beam 12 is combined with a beam 13 of an escort laser 19 of wavelength $\lambda_2$, by use of a dichroic beam splitter 16, which beam splitter may be the same as one of the other optical components of the system, or a separate optic. Other coupling means are within the scope of the invention and variously discussed below.

The two beams are then passed through a non-linear medium 15 (which may be Periodically Poled Lithium Niobate (PPLN), for example), where the signal beam, interacting with the escort beam, is first up-converted to a wavelength $\lambda_3$. Energy conservation requires $1/\lambda_1 + 1/\lambda_2 = 1/\lambda_3$ (Analogously, $1/\lambda_1 - 1/\lambda_2 = 1/\lambda_3$ applies if difference frequency generation is used instead of up-conversion, as also encompassed within the scope of the present invention. For simplicity, only the up-conversion case is described.) For the case of quasi-phase-matching, the condition must obtain that $$\frac{n_3}{\lambda_3} = \frac{n_1}{\lambda_1} + \frac{n_2}{\lambda_2} + \frac{N}{\Lambda},$$

where $n_i$ are the indices of refraction at the respective wavelengths $\lambda_i$, while $\Lambda$ is the poling period of the crystal and N is the phase-matching order (typically, unity).

Lithium niobate is an example of a non-linear material for use in the active arm of the interferometer that is both transparent in the visible spectrum and over a large portion of the infrared spectrum, and which, by virtue of its 3 m point-group symmetry, exhibits a large second-order non-linear susceptibility, due to ionic (lattice) origins alone.

Escort beam 13, mixed into the active arm 14 and coupled by means of dichroic beamsplitter 16, so as to traverse non-linear medium 15, is chosen along with the non-linear crystal such that they are either phase-matched or quasi-phase-matched with the signal wavelength. If the escort laser 19 is turned off and the interferometer is balanced, then all of the signal will exit the interferometer through Port 1 where the beams traversing the two paths interfere constructively, whereas no signal will exit through Port 2, where the beams traversing the two paths interfere destructively.

When escort laser 19 is turned on to provide escort beam 17 with the proper intensity (as discussed below), all of the signal beam 12 will be up-converted (to a frequency equal to the sum of the frequency of the signal beam and the frequency of the escort beam), and then down-converted back to the original wavelength, but will have acquired a $\pi$ phase-shift in the active arm 14 of the interferometer 10. Thus, when the light 14 recombines with the "passive" arm 18, it now exits the interferometer in Port 2 rather than Port 1. Thus, the signal beam 12 has been switched from Port 1 to Port 2 by the application of the escort laser beam.

High-efficiency up-conversion experiments by VanDevender & Kwiat, *High Efficiency Single Photon Detection via Frequency Up-Conversion, J. Modern Opt.*, vol. 51, pp. 1433-45, (2004), incorporated herein by reference, have shown that if the electric field amplitude of the escort laser is equal to $$E_0 = \frac{\sqrt{n_1 n_2 \lambda_1 \lambda_2}}{4 L d_Q},$$

where L is the length of the crystal and $d_Q$ is the effective non-linear coefficient of the crystal, then nearly all of the signal light will be converted to $\lambda_3$.

In accordance with preferred embodiments of the present invention, an escort beam 13 with an electric field amplitude of $E = 2E_0$ is used, with the effect of "over-converting" the input light from $\lambda_1 \rightarrow \lambda_3 \rightarrow \lambda_1$ with an additional $\pi$ phase shift. The phase shift is readily removed by turning off the escort beam.

After the light in arm 14 leaves the conversion crystal 15, it recombines with the passive arm 18 and exits the interferometer. If the escort light is off and no phase has been applied to the active arm, then all of the light will exit Port 1 of the interferometer. Turning on the escort light will apply a $\pi$ phase shift to the active arm, and cause the output light to switch from Port 1 to Port 2.

It is to be understood that rather than complete phase matching over an entire interaction length in a homogeneous crystal, quasi-phase matching in a periodically poled non-linear crystal, such as periodically poled lithium niobate (PPLN) may also be used. Solution of the coupled field-evolution equations for quasi-phase-matching is described in Myers et al., *Quasi-phase-matched optical parametric oscillators in bulk periodically poled LiNbO_3, J. Opt. Soc. Am. B*, vol. 12, pp. 2102-2116, (1995), which is incorporated herein by reference. As shown by Myers et al., for a strong pump field, the signal laser is converted to a state given by:

$$|out\rangle = e^{i\phi_s}\cos(\alpha z)|\omega_s\rangle + e^{i(\phi_e + \phi_s + \frac{\pi}{2})}\sin(\alpha z)|\omega_o\rangle,$$

where $\omega_s$ and $\omega_o$ are the signal and up-converted frequency states, respectively, and $\phi_s$ and $\phi_e$ are the phases of the signal and escort beams, z is the length of the crystal, and $\alpha$ is a constant which depends on the focusing and intensity of the escort beam and the effective nonlinear coefficient and indices of refraction at wavelengths $\lambda_1$, $\lambda_2$, and $\lambda_3$ of the nonlinear crystal.

For $\alpha z=\pi$, the output state becomes $|out\rangle = -e^{i\phi}s|\omega_o\rangle$, which is equivalent to a phase shift of the input signal state by a $\pi$-phase shift. Achievement of $\alpha z=\pi$ has been demonstrated.

In addition to applying the foregoing up-conversion phase-modulation technique to one arm (or both arms, per discussion below) of a Mach-Zehnder interferometer, high-speed, and substantially transparent, phase-, intensity-, or polarization-modulation may similarly be obtained in other configurations, all within the scope of the present invention.

Figure 2:
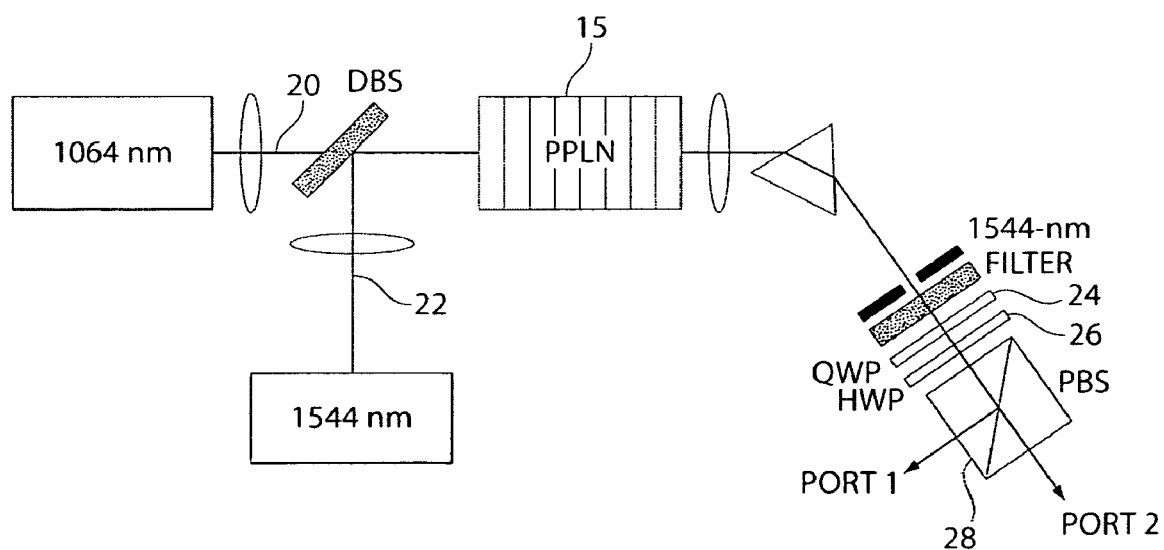
FIG. 2 depicts an embodiment of the present invention configured as a polarization modulator in a fiber-optic system.
Figure 3:
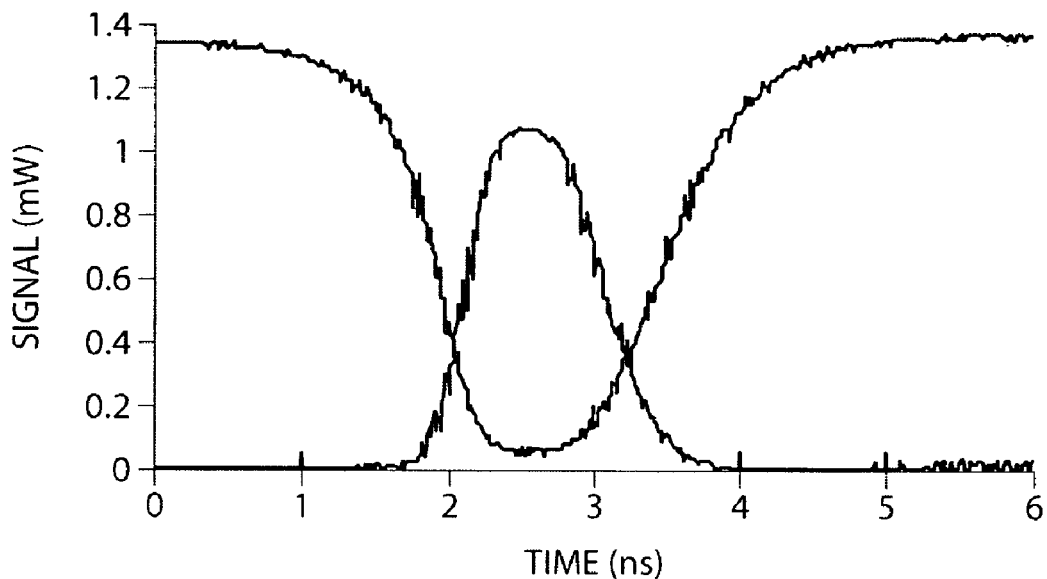
FIG. 3 shows relative intensities at the respective output ports of a switch as a function of time during the switching process, employing an embodiment of the present invention.

Other embodiments of the present invention operate in a polarization modulation mode, now described with reference to FIG. 2. A diagonally polarized signal laser beam 22 is combined with an intense escort beam 20 and sent though a non-linear medium such as crystal 15. Escort and signal wavelengths are either phase-matched or quasi-phase-matched in crystal 15. With proper escort intensity, the entire signal beam is frequency converted to the idler wavelength and back to the signal, which induces a $\pi$-phase shift in the vertical component of the signal, thus rotating the polarization to anti-diagonal, i.e., to the polarization perpendicular to that of the incident signal beam 22. A quarter-wave plate (QWP) 24 and a half-wave plate (HWP) 26 are used in a conventional manner, in combination with a polarizing beam splitter (PBS) 28 to analyze the polarization of the beam, directing the beam respectively to Port 1 and Port 2 depending upon whether the escort beam is applied, or not. FIG. 3 shows the outputs, temporally resolved, of both polarization components during a switching pulse.

Four-Wave Embodiments

While the invention has been described, heretofore, using a three-frequency ($\chi^{(2)}$) system to provide a $\pi$ phase shift on the signal frequency, in other embodiments of the invention, an equivalent $\pi$ phase shift may be achieved using a four-frequency ($\chi^{(3)}$) system. In a four-frequency system, the escort beam 13 (shown in FIG. 1) is replaced by two beams 13 and 130 (shown in FIG. 1) which are phase-matched to convert the light at the signal frequency to the output frequency and back again to the signal frequency, and thereby acquiring a $\pi$ phase shift. Efficient conversion of a signal wavelength to an output frequency has been demonstrated for $\chi^{(3)}$ systems by Mechin et al., 180-*nm Wavelength Conversion Based On Bragg Scattering in an Optical Fiber, Optics Express*, vol. 14, pp. 8995-8999 (2006), which is incorporated herein by reference. Once the escort wavelength has been replaced by two appropriately phase-matched beams in a $\chi^{(3)}$ medium, the rest of the switching system operates as with the $\chi^{(2)}$ case.

Frequency Multiplexing

The switch implementation in accordance with the invention, as described above, very advantageously provides for multiplexing several signal wavelengths using the same interferometer and crystal by choosing a variety of escort beams, each of which has a wavelength which is phase-matched to one of the signal wavelengths. By independently controlling each escort laser, we can independently control which port the corresponding signal wavelength passes through.

The Sellmeier equation (describing the wavelength dependence of the index of refraction of a medium) has a complex temperature dependence, in the case of lithium niobate is complex, and two useful approximations, as well as a numerical solution to the full 6th order Lagrange expansion of the Sellmeier equation, are now discussed.

If three wavelengths ($\lambda_1$, $\lambda_2$, and $\lambda_3$) are chosen as a starting phase-matched configuration, and the Sellmeier equation is approximated as being flat (constant dispersion) in the regions near the three wavelengths, a simple relationship can be derived for the escort wavelength ($\lambda_2$) as a function of the signal wavelength ($\lambda_1$). In the case of quasi-phase-matching, applying the phase-matching equation given above, the escort wavelength, subject to these approximations, is then simply:

$$\lambda_2 = \frac{n_3 - n_2}{\frac{1}{\Lambda} - \frac{n_3 - n_1}{\lambda_1}}.$$

However, this equation is only useful for signal wavelengths close to the values we chose for our constant dispersion approximation. In order to multiplex a wider band of wavelengths, a better approximation is required.

Linear Dispersion Approximation

A better, yet reasonably simple, approximation for the $\lambda_2$ wavelength required for phase-matching may be obtained by approximating the dispersion near the three wavelengths of interest with a straight line, instead of with a constant. In particular, one may express the indexes ($n_i$) as $n_i = m_i \lambda_i + b_i$. After substituting $\lambda_3$ in terms of $\lambda_1$ and $\lambda_2$, the phase-matching condition is readily solved to yield:

$$\lambda_2 = \frac{b_3 - b_2}{\frac{1}{\Lambda} - m_3 + m_2 + m_1 - \frac{b_2 - b_1}{\lambda_1}}.$$

Figure 4:
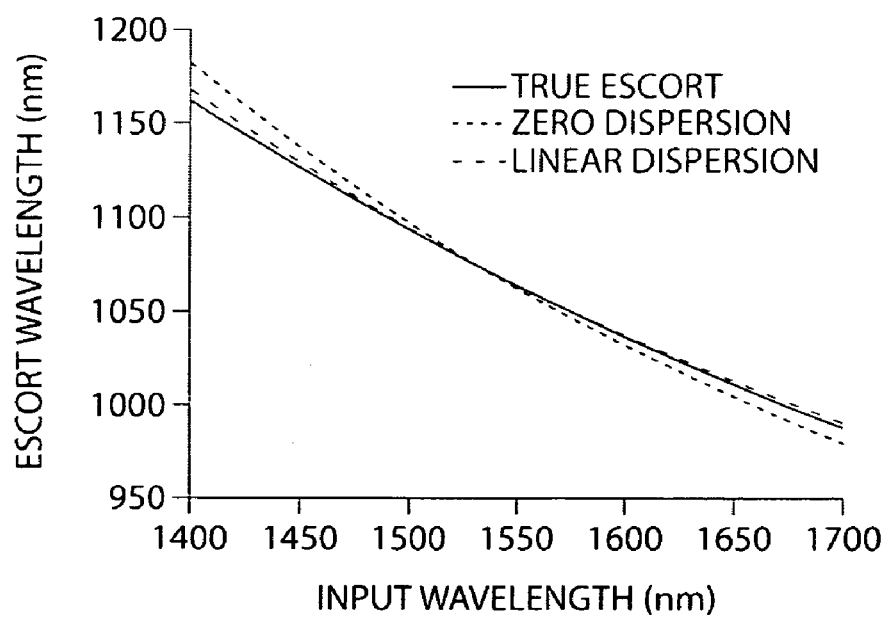
FIG. 4 shows the dependency of the empirically derived escort wavelength ($\lambda_2$) on input wavelength ($\lambda_1$) for a fixed crystal poling period ($\Lambda$) in conjunction with the wavelength derived in two approximations.

Accordingly, the requisite escort wavelength $\lambda_2$ is plotted in FIG. 4 as a function of input wavelength using the "true" Sellmeier equation, the constant dispersion approximation, and the linear dispersion approximation. For the latter two, the relevant approximations were made near the points $\lambda_1=1550.0$ nm, $\lambda_2=1064.0$ nm, and $\lambda_3=630.9$ nm. The poling period used was $\Lambda=11.4$ µm.

Figure 5:
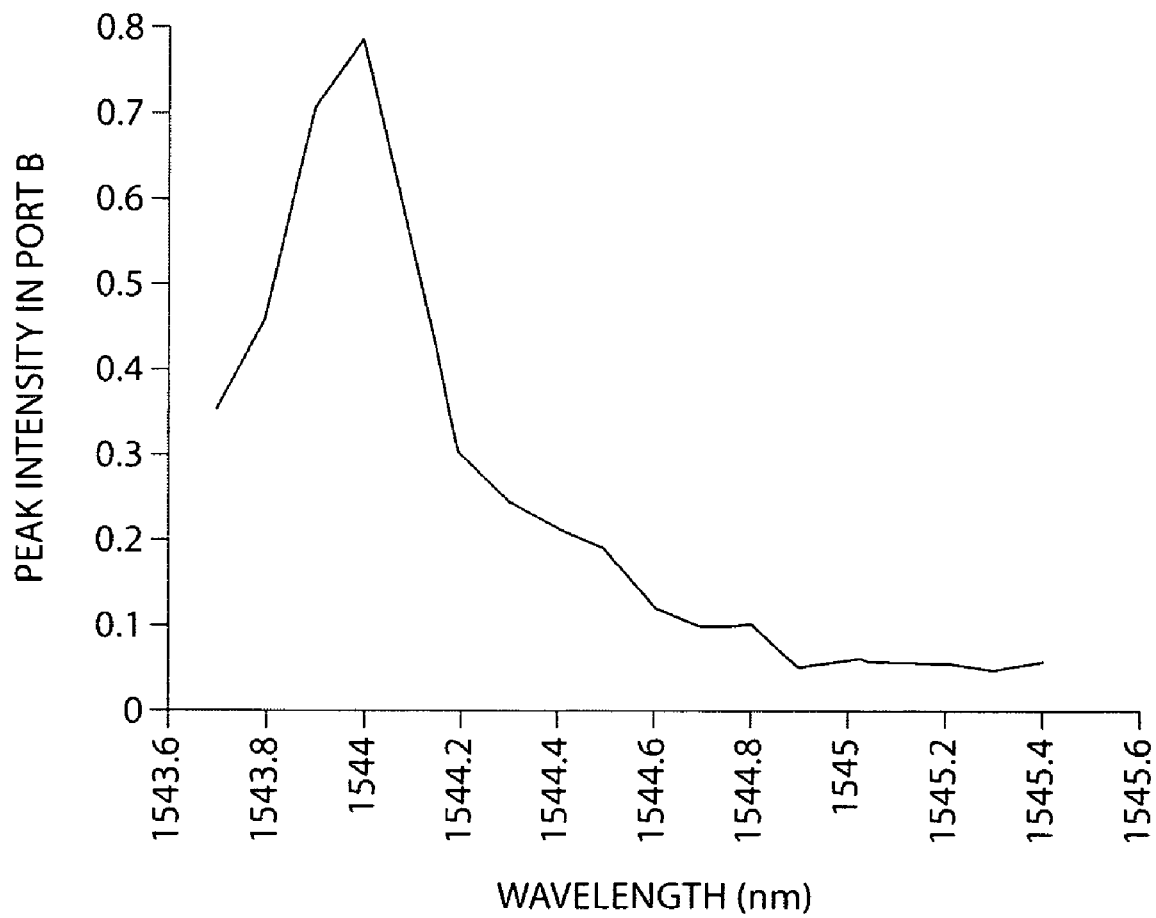
FIG. 5 shows the selectivity of an escort beam in switching a signal beam, where beam switching is plotted as a function of the wavelength of the signal beam.

The selectivity of the escort wavelength in switching a signal beam is demonstrated by the line profile shown in FIG. 5, where the intensity of signal switched into the alternate port is shown as a function of signal beam wavelength, for a fixed escort beam wavelength.

Further Considerations

In a typical Mach-Zehnder interferometer configuration, shown in FIG. 1, it is usually only necessary for the lengths of the two arms to differ by an amount which is an integer multiple of the wavelength, and short compared to the coherence length. However, in accordance with preferred embodiments of the present invention, since one arm is traveling through a crystal which is highly dispersive, it would be difficult to configure the interferometer such that it works at all wavelengths if the passive arm does not also experience the same dispersion. Consequently, an identical non-linear crystal (not shown) can be provided, in accordance with certain embodiments, within the passive arm 18 which will compensate for any dispersion introduced in the crystal 15 in the active arm 14.

In other embodiments of the invention, the described switch may be implemented in optical waveguide, with the attendant advantage of greatly reduced requisite switching power levels. For simplicity, especially in the waveguide case, the passive crystal may be merely an alternate path through the active crystal which does not interact with the escort laser.

For manufacturing convenience, in the case of a switching medium incorporated into both arms of an interferometer, an electric field may be placed across either the active or passive crystals to cause an electric-field-induced index change as a phase biasing mechanism which will balance out the two arms of the interferometer. With the escort off, the voltage across one crystal may be varied until all the light exits Port 1. Then activating the escort beam 13 while keeping the bias voltage constant, will cause the light to switch to Port 2.

While combination of the escort 13 and signal 12 beams has been depicted using dichroic beamsplitters 20, any means of combining them is within the scope of the present invention. For example, in a waveguide configuration, waveguide couplers may be used which are of a length to perform a swap operation on the escort wavelength but have no effect on the signal wavelength. This allows the escort beam to be efficiently combined with the signal before the crystal and to be separated out once the conversion has taken place.

The embodiments of the invention heretofore described are intended to be merely exemplary and numerous variations and modifications will be apparent to those skilled in the art. All such variations and modifications are intended to be within the scope of the present invention as defined in the appended claims.

What is claimed is:

1. A method for switching at least one wavelength component of an optical signal from a first state to a second state differing from the first state by an optical phase difference of $\pi$ radians, the optical signal wavelength component characterized by a first signal wavelength and a first signal frequency and by a phase at that first signal frequency, the method comprising:
   a. incrementing the phase of the optical signal component by interaction in a non-linear medium with a first escort beam characterized by an escort beam frequency;
   b. generating a wave at a converted frequency equal to a sum or a difference of the first signal frequency and the escort beam frequency and then converting the wave back into the first signal frequency; and
   c. switching the state of the optical signal wavelength component on the basis of its incremented phase.

2. A method in accordance with claim 1, wherein the non-linear medium is characterized by a second-order nonlinear susceptibility.

3. A method in accordance with claim 1, wherein the non-linear medium is characterized by a third-order nonlinear susceptibility, and wherein the step of incrementing the phase of the optical signal component further includes phase matching of interacting beams in the non-linear medium.

4. A method in accordance with claim 1, wherein the state of the optical signal component includes transmission through a port of an interferometer.

5. A method in accordance with claim 1, wherein the state of the optical signal component includes a polarization.

6. A method in accordance with claim 1, wherein the step of incrementing the phase of the optical signal component includes converting at least a portion of the energy in the optical signal component to an idler wavelength and back to the first signal wavelength in a parametric process.

7. A method in accordance with claim 1, further comprising: separately controlling a state of a second component of the optical signal by virtue of interaction within the non-linear medium with a second escort beam.

8. An optical switch comprising:
   a. an input port for receiving a signal beam including of at least one wavelength component;
   b. a non-linear medium in optical communication with the input port;
   c. a coupler for coupling an escort beam into the non-linear medium; and
   d. an analyzer element for directing a wavelength component of the signal beam to a specified one of a first and a second output port based upon whether a phase shift of $\pi$ radians has been imposed upon the wavelength component of the signal beam by conversion of the wavelength component of the signal beam to an idler frequency and then back to the wavelength component of the signal beam by mutual interaction of the signal beam and escort beam within the non-linear medium.

9. An optical switch in accordance with claim 8, wherein the non-linear medium comprises at least one non-linear crystal.

10. An optical switch in accordance with claim 8, wherein the non-linear medium comprises at least one crystal characterized by a second-order nonlinear susceptibility.

11. An optical switch in accordance with claim 8, wherein the non-linear medium comprises at least one crystal characterized by a third-order nonlinear susceptibility.

12. An optical switch in accordance with claim 8, wherein the analyzer element is an interferometer.

13. An optical switch in accordance with claim 8, wherein the analyzer element is a Mach-Zehnder interferometer.

14. An optical switch in accordance with claim 12, wherein the non-linear medium includes a non-linear crystal in a first arm of the interferometer and an analyzer element in a second arm of the interferometer.

15. An optical switch in accordance with claim 8, wherein the analyzer element is a polarizing beam splitter.

16. An optical switch in accordance with claim 8, wherein the non-linear medium is periodically poled non-linear crystal.

17. An optical switch in accordance with claim 8, wherein the coupler is a dichroic beamsplitter.

* * * * *